July 14, 1942. J. PERMANN ET AL 2,289,854
SEAT ATTACHMENT FOR FARM MACHINERY
Filed May 11, 1939
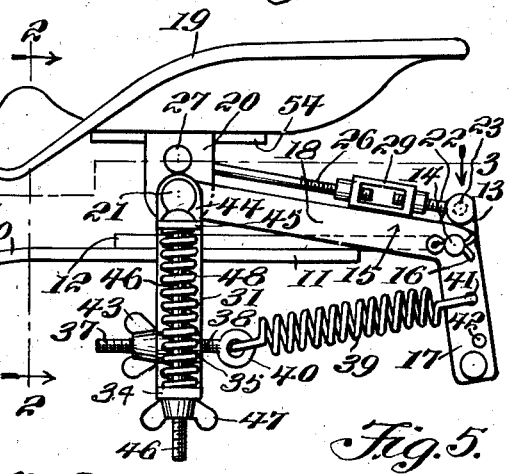
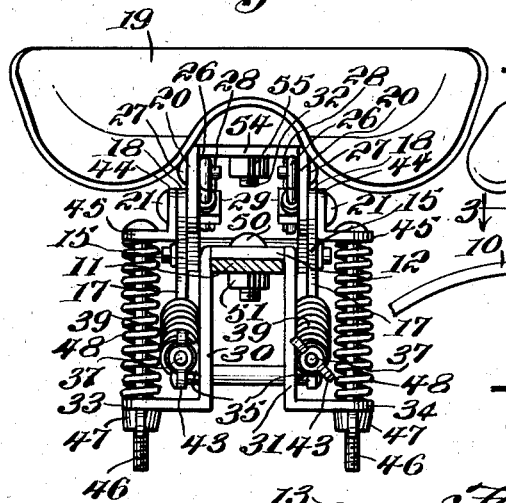
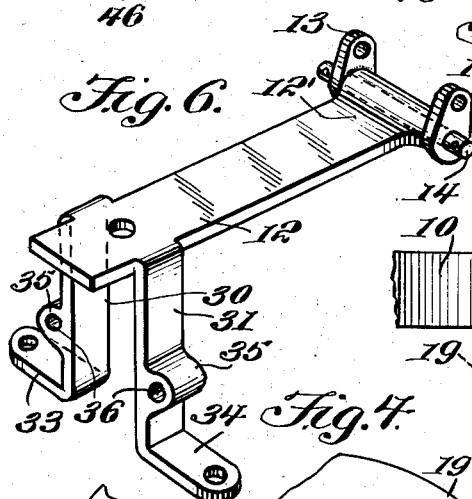
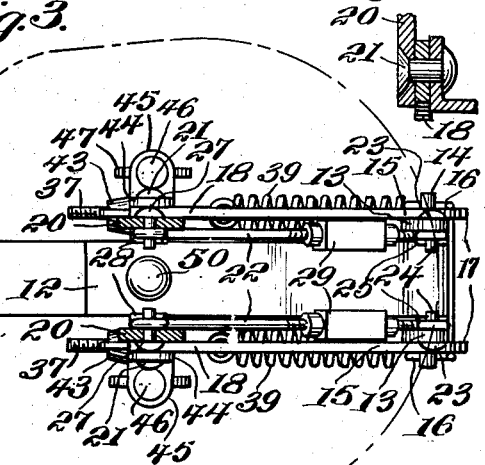
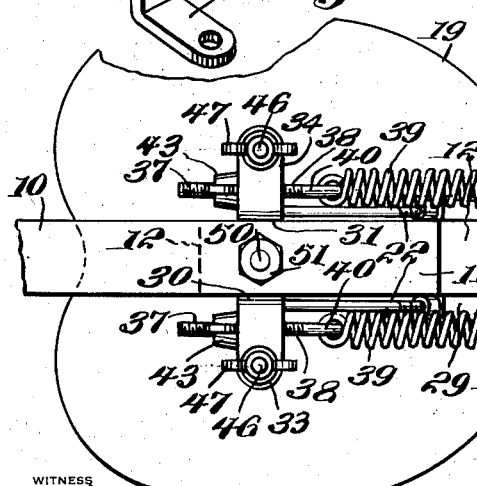
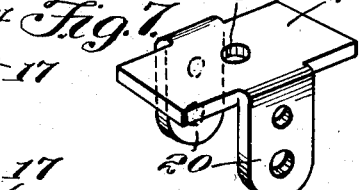
Julius Permann
Emil E. Jerke INVENTORS
BY Victor J. Evans & Co.
ATTORNEYS
WITNESS
J. T. L. Wright Patented July 14, 1942

2,289,854

UNITED STATES PATENT OFFICE 2,289,854

SEAT ATTACHMENT FOR FARM MACHINERY

Julius Permann and Emil E. Jerke, Charles Mix County, S. Dak.

Application May 11, 1939, Serial No. 273,108

4 Claims. (Cl. 155—51)

Our invention relates to new and useful improvements in the construction and arrangement of parts of seat attachments for vehicles.

An important object of our invention is the provision of an improved construction of vehicle seats that will afford the person seated thereon a maximum of comfort.

Another object of our invention is the provision of an improved construction of vehicle seats wherein the angle of the seats may be selectively varied.

Still another object of our invention is the provision of an improved construction of vehicle seats that is efficient in operation and inexpensive to manufacture.

Other objects and advantages of our invention will be apparent during the course of the following description.

In the drawing, forming a part of this specification, and in which like numerals are employed to designate like parts throughout the same, Figure 1 is a side elevation of a device embodying our invention, Figure 2 is a vertical sectional view, taken on the line 2—2 of Figure 1, Figure 3 is a transverse sectional view, taken on the line 3—3 of Figure 1, Figure 4 is a bottom plan view of our device, Figure 5 is a vertical sectional view taken on the line 5—5 of Figure 1, Figure 6 is a perspective view of the spring supporting bracket, embodying a part of our invention, and Figure 7 is a perspective view of the seat clip, embodying a part of our invention.

In the accompanying drawing, wherein for the purpose of illustration, is shown a preferred embodiment of our invention the numeral 10 designates a resilient leaf spring support, the inner end of which is secured to a vehicle, such as any of the conventional types of farm machinery, and the outer end 11 thereof is suspended free from attachment with the vehicle in a manner whereby a resilient spring action is obtained. A spring supporting bracket 12 is bolted to the extremity of the spring support 10 by means of the bolt and nut 50 and 51, respectively, and the outer end 12' thereof extends substantially beyond the end of the support 10. The upwardly extending ears 12 are welded to the end 12' of the support, and a transversely positioned pintle 14 is carried thereby with the ends thereof extending laterally of the ears 13. The spring supporting bracket 12 is formed with depending arms 30 and 31 adjacent the forward end thereof.

The lower ends of the depending arms 30 and 31 are bent outwardly to form the spring seats 33 and 34, and the arms are formed at substantially their middle with protuberances 35 which have openings 36 therethrough to receive the shank 37 of eye bolts 38.

The bell crank arms 15 are pivotally mounted on the ends of the pintle 14 extending beyond the ears 13 and the arms are secured against lateral displacement thereon by means of cotter pins 16. Each of the arms 15 is formed with a shank portion 17 which extends downwardly from the pintle 14 to terminate a substantial distance below the spring supporting bracket 12 and a shank portion 18 which extends upwardly and inwardly from the pintle 14 to terminate in vertically spaced relation with the spring seats 33 and 34. A seat 19, of conventional design, is provided with a depending screw-threaded shank 52 which is adapted to be received by the opening 53 in the seat clip 54 and to be held therein by the nut 55. The seat clip 54 is formed with spaced depending arms 20 which are received between the extremities of the shank portions 18 and pivotally secured thereto by the rivets 21.

The rods 22 are pivotally attached to the ears 13 of the spring supporting bracket 12 by means of the pins 23 which pins are formed with inwardly extending shanks 24. The ends of the rods 22 are looped about the shanks 24 and are held thereon against lateral displacement therefrom by means of the cotter pins 25. The rods 26 are attached to the depending arms 20 of the seat clip 54 by means of the bolts 27 and cotter pins 28 and, in order to effect rocking of the seat about the rivets 21, the rods connect with the seat clip at a point above the point of attachment of the arms 20 to the shank portions 18. The free ends of the rods 22 and 26 are provided with right and left hand threads respectively to threadedly receive the turn-buckles 29 which may be rotated to draw the ends of the rods together or to move the same farther apart.

The substantially horizontally disposed springs 39 have one end thereof attached to the heads 40 of the eye bolts 38, and the other end thereof extending through openings 41 in the depending shank portions 17 of the seat supporting arms 15. An additional opening 42 may be provided in the depending shank portions 17 to permit a slight angular adjustment of the springs 39 if desired. The eye bolts 38 are secured in position by means of the wing nuts 43 which are threadedly received on their outer ends and the tension of the springs 39 may be selectively varied by a proper adjustment of the wing nuts 43.

The brackets 44, supported from the rivet 21 exteriorly of the shank portions 18, are formed with an outwardly extending portion 45. Bolts 46 and wing nuts 47 join the spring seats 33 and 34 of the spring supporting bracket 12 and the outwardly extending spring seat portions 45 of the brackets 44. Vertically disposed coil springs 48 are carried by the bolts 46 and have their upper ends thereof seated against the portion 45 of the brackets 44, and the lower ends thereof seated against the spring seats 33 and 34 of the spring supporting bracket 30. The tension of the springs 48 may be selectively varied by properly adjusting the wing nuts 47, which when threaded inwardly will draw the ends of the seat supporting arms 18 downwardly against the compressive action of said springs and the resilient action of coil springs 39.

By varying the tension on the coil springs 39 and 48 the resistance of the seat 19 to shocks and bumps may be selectively adjusted, and by adjusting the turn buckles 29, the angle of the seat 19 with respect to the horizontal may be effected to comfortably accommodate the person seated thereon. When the vehicle to which the seat is attached strikes an obstruction, the shock will be received directly by the vertically disposed springs 48, and as the seat moves downwardly against the resilient action of the springs 48, the shock will be increasingly absorbed by the horizontally disposed springs 39. By reason of the fact that the springs extend in a plane disposed at substantially right angles to the springs 48, they will materially reduce or lessen the rebound action of the springs 48. The initial tension of the springs may be selectively varied to properly accommodate the weight of the person seated in the seat 19.

It is to be understood that the form of our invention, herewith shown and described, is to be taken as a preferred example of the same, and that various changes in the size and shape and arrangement of parts may be resorted to without departing from the spirit of our invention or the scope of the appended claims.

Having thus described our invention, we claim:

1. A seat attachment comprising a supporting bracket having spring seats at one end thereof; bell cranks pivotally mounted on the end of the bracket remote from the spring seats, one shank portion of each of the bell cranks extending downwardly from its pivot and below the bracket and the other shank portion thereof extending angularly upwardly from the pivot to terminate substantially above the spring seats; a seat mounted on the last mentioned shank portions of the bell cranks; spring means interposed between the spring seats of the bracket and the superjacent ends of the bell cranks for yieldably resisting movement of the seat in the direction of the bracket; and other spring means extending between and connected to the supporting bracket and the depending shank portion of the bell cranks.

2. A seat attachment comprising a supporting bracket; bell cranks pivotally mounted on one end of the bracket, one shank of the bell cranks extending below the bracket and the other shank thereof having a spring seat and extending above the bracket; a seat mounted on the shanks of the bell cranks extending above the bracket; springs interposed between the bracket and the spring seats of the bell crank for yieldably resisting movement of the seat in the direction of the bracket; and other springs extending between the bracket and the downwardly extending shanks of the bell cranks.

3. A seat attachment comprising a supporting bracket having spring seats at one end thereof; bell cranks pivotally mounted on the end of the bracket remote from the spring seats, one shank portion of each of the bell cranks extending downwardly from its pivot and below the bracket and the other shank portion thereof extending angularly upwardly from the pivot to terminate substantially above the spring seats; a seat pivotally mounted on the last mentioned shank portions of the bell cranks; adjustable means for rocking the seat about its pivot and for holding the same in a selected adjusted position; spring means interposed between the spring seats of the bracket and the superjacent ends of the bell cranks for yieldably resisting movement of the seat in the direction of the bracket; and other spring means extending between the bracket and the depending shank portion of the bell cranks.

4. A seat attachment comprising a supporting bracket; bell cranks pivotally mounted on one end of the bracket, one shank of the bell cranks extending below the bracket and the other shank thereof having spring seats and extending above the bracket; a seat pivotally mounted on the shanks of the bell cranks extending above the bracket; adjustable means for rocking the seat about its pivot and for holding the same in a selected adjusted position; springs interposed between the bracket and the spring seats of the bell crank for yieldably resisting movement of the seat in the direction of the bracket; and other springs extending between the bracket and the downwardly extending shanks of the bell cranks.

JULIUS PERMANN.
EMIL E. JERKE.